H. C. HART.
METHOD OF MANUFACTURING KNIVES.
APPLICATION FILED FEB. 9, 1911.
999,557.
Patented Aug. 1, 1911.
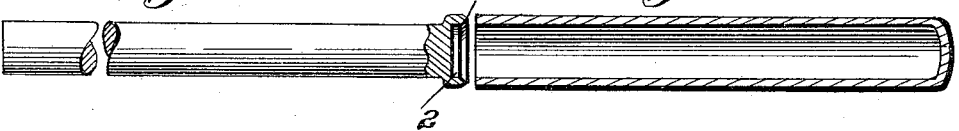
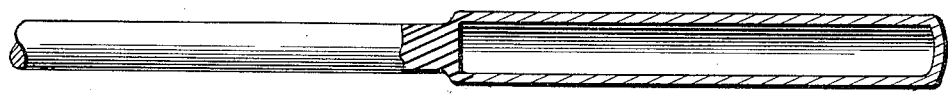
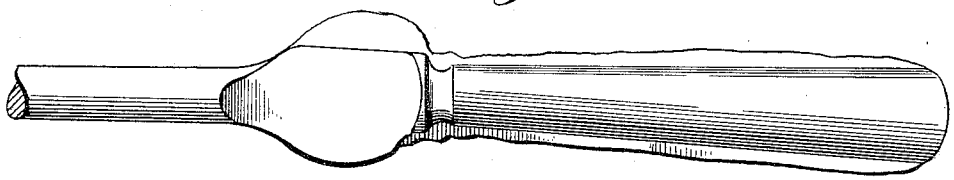
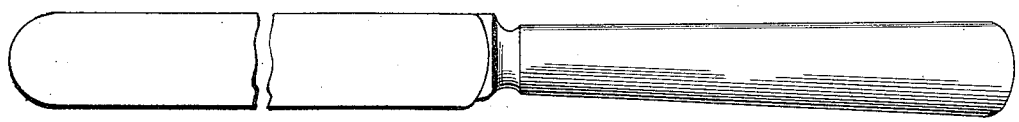

UNITED STATES PATENT OFFICE.

HUBERT C. HART, OF UNIONVILLE, CONNECTICUT.

METHOD OF MANUFACTURING KNIVES.

999,557.

Specification of Letters Patent.  Patented Aug. 1, 1911.

Application filed February 9, 1911.  Serial No. 607,707.

*To all whom it may concern:*

Be it known that I, HUBERT C. HART, a citizen of the United States, residing at Unionville, in the county of Hartford and State of Connecticut, have invented certain new and useful Improvements in Methods of Manufacturing Knives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in the method of manufacturing knives.

The object of the invention is to provide economical and effective means for manufacturing knives having hollow handles.

In the drawings: Figure 1 illustrates a view of a section of a rod from which a knife blade is to be formed. Fig. 2 is a sectional view of the same, but illustrating one end cupped. Fig. 3 is a sectional view of a tube from which a hollow knife handle is to be formed. Fig. 4 is a view of the rod and tube welded together. Fig. 5 is a view illustrating a knife partially formed from the welded rod section and tube. Fig. 6 is a view of the completed knife.

In carrying out my improved process, I first provide a section of a round bar 1, indicated in Fig. 1, and then cup the end of the same as shown at 2. The cupped end is struck up to form a head, and its outer edge is beveled as at 3, to cause the metal to more readily weld, in the subsequent welding operation. The tubular section is of uniform diameter throughout its length, and is of substantially the diameter of the head on the cupped end of the rod.

The beveled edge of the head of the rod is brought into contact with the end of the tube and is preferably subjected to the electric welding process to secure the ends together. The beveled edge being much thinner than the remaining wall of the cupped end it is more susceptible to the heat and therefore more effectually unites with the end of the tube thereby producing a cylindrical reduced blade end, and a tubular handle end as shown in Fig. 4.

After the rod and tube have been welded together, the form is then placed in a die and the handle and bolster of the knife are properly shaped, as shown in Fig. 5. This having been accomplished the rod, is drawn out in a separate operation to complete the blade.

By employing a process for forming knives, such as described, the various steps can be quickly and conveniently carried on, whereby I am enabled to economically and conveniently produce the product in a more expeditious manner than heretofore.

Having thus described my invention what I claim is:—

The herein described method of manufacturing knives consisting in forming a cup on the end of a rod and beveling the same to form a sharp edge, then placing the sharp edge against the flat edge of a tube closed at one end and electrically welding the meeting edges of the rod and tube, then shaping the tube to form a handle and subsequently drawing out the rod to form a knife blade.

In testimony whereof I have signed my name to this specification in the presence of two subscribing witnesses.

HUBERT C. HART.

Witnesses:
 NELLIE M. HART,
 NELLIE PROUT.

Copies of this patent may be obtained for five cents each, by addressing the "Commissioner of Patents, Washington, D. C."